Figure 5:
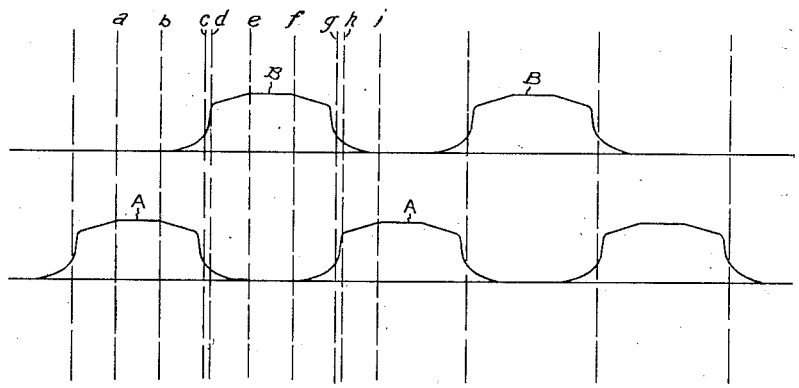

June 2, 1942.  B. D. BEDFORD  2,284,794
ELECTRIC CIRCUITS
Filed Dec. 1, 1936   2 Sheets-Sheet 1
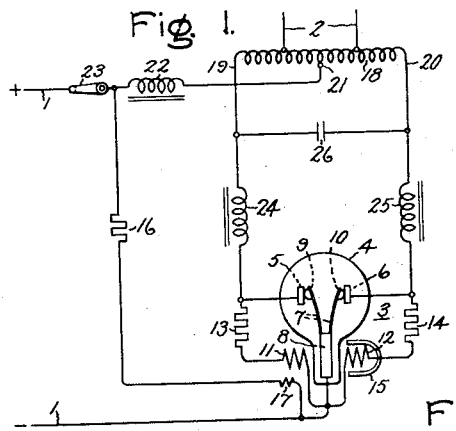
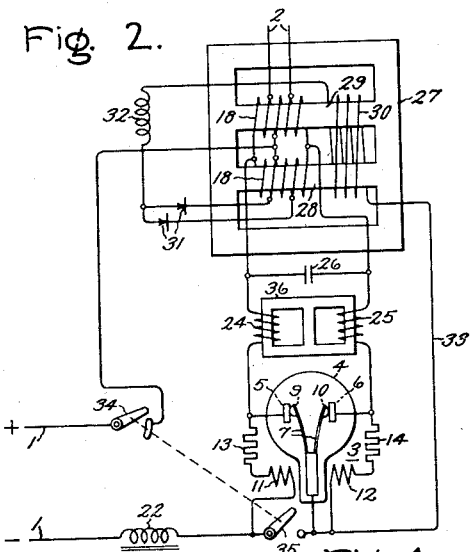
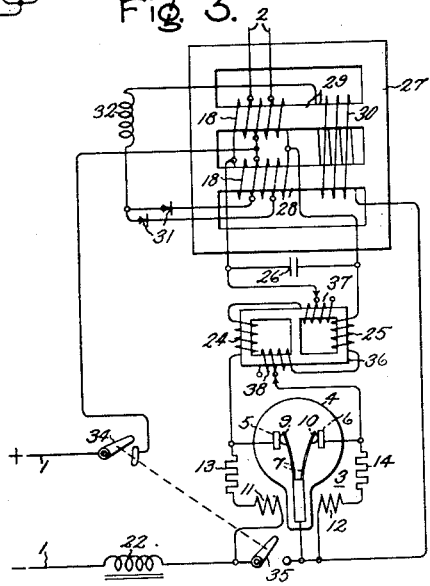
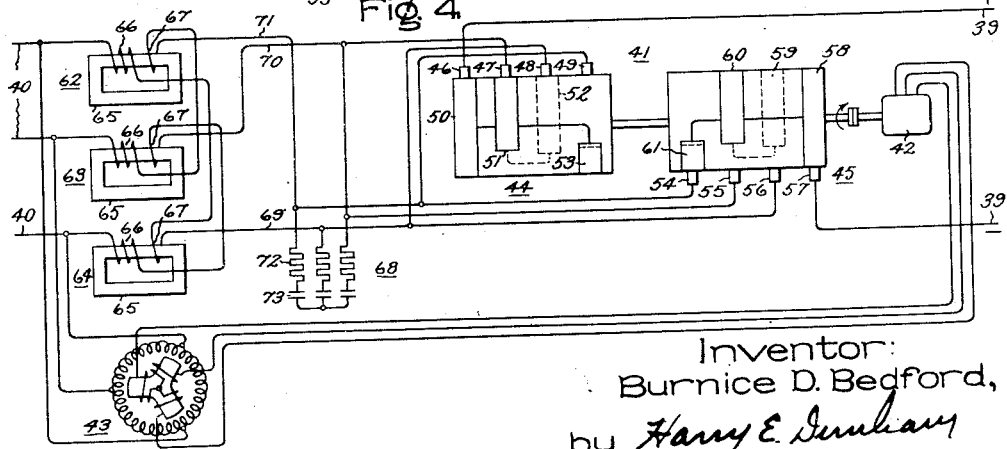
Inventor:
Burnice D. Bedford,
by Harry E. Dunham
His Attorney.

June 2, 1942.  B. D. BEDFORD  2,284,794
ELECTRIC CIRCUITS
Filed Dec. 1, 1936  2 Sheets-Sheet 2

Inventor:
Burnice D. Bedford,
by Harry E. Dunham
His Attorney.

Patented June 2, 1942

2,284,794

UNITED STATES PATENT OFFICE 2,284,794

ELECTRIC CIRCUITS

Burnice D. Bedford, Schenectady, N. Y., assignor to General Electric Company, a corporation of New York Application December 1, 1936, Serial No. 113,581

30 Claims. (Cl. 175—363)

My invention relates to electric circuits and more particularly to electric circuits for use in conjunction with circuit interrupting means.

In many applications where circuit interrupting devices are used, it is desirable to control the currents of the associated circuits so that the circuit interrupting duty imposed is not excessive. It is advantageous to construct and arrange the associated circuits and equipment to effect a substantial reduction in the current to be interrupted. By reducing the current immediately prior to or coincidentally with the circuit interrupting operation, it is apparent that the size and rating of the interrupting means may be considerably reduced as compared with that which would be required if the circuit interrupting means were required to interrupt the maximum currents of the associated circuit or circuits. For example, in electric translating circuits, such as rectifying and inverting circuits employing switching or mechanical interrupting means, it is desirable from an economic standpoint to reduce as much as possible the current to be interrupted so that the switching or interrupting means may be correspondingly reduced in size and rating.

It is an object of my invention to provide a new and improved electric circuit.

It is another object of my invention to provide a new and improved current interrupting means.

It is a further object of my invention to provide a new and improved electric translating circuit.

It is a still further object of my invention to provide a new and improved circuit interrupting means for use in electric converting systems.

In accordance with the illustrated embodiments of my invention, I provide an improved electric circuit and circuit interrupting means whereby the current conducted by the circuit interrupting means is decreased immediately preceding and during the circuit interrupting operation so that the duty imposed on the circuit interrupting means is materially reduced. In particular, in one embodiment of my invention I provide a circuit interrupter, such as a mechanical switch of the vibratory type, which is connected in series relation with a saturable reactor, which reduced the current during the interrupting period. This circuit is arranged for transmitting energy between a direct current circuit and a single phase alternating current circuit and includes means, such as a capacitance, which is discharged at predetermined times to increase the inductance of the reactor.

In another of the illustrated embodiments of my invention, I provide an improved electric translating circuit for transmitting energy between a direct current circuit and a polyphase alternating current circuit. A mechanical commutator, comprising a plurality of switching means synchronously operated with respect to the alternating current circuit, serves to interconnect the polyphase alternating current circuit and the direct current circuit, each of the switching means conducting current during predetermined recurring intervals. Associated with each of the switching means, I provide a plurality of saturable reactors, that is, saturable inductance reactances, each of which comprises a core member, a winding connected in series relation with the associated switching means and a control winding. The control winding is energized in accordance with the current in another phase of the alternating current circuit and cooperates with the commutating electromotive force so that the inductance of the series winding is increased at or near the end of the conducting periods, effecting thereby a reduction in the current to be interrupted by the associated switching means.

For a better understanding of my invention, reference may be had to the following description taken in connection with the accompanying drawings and its scope will be pointed out in the appended claims. Figs. 1, 2 and 3 diagrammatically illustrate an embodiment of my invention as applied to an electric translating circuit for transmitting energy between a direct current circuit and a single phase alternating current circuit, and Fig. 4 diagrammatically shows another embodiment of my invention as applied to an electric translating system for transmitting energy between a direct current circuit and a polyphase alternating current circuit. Fig. 5 represents certain operating characteristics of the embodiment of my invention shown in Figs. 1, 2 and 3, and Fig. 6 represents certain operating characteristics of the embodiment of my invention shown in Fig. 4.

Referring to Fig. 1 of the accompanying drawings, I have chosen to represent my invention as applied to an electric translating system for transmitting energy between a direct current circuit 1 and a single phase alternating current circuit 2. The electric translating system includes a circuit interrupting means which may be of the mechanical type such as a vibratory mechanical switch 3 having an envelope 4, stationary contacts 5 and 6 and a movable contact member 7. The envelope 4 may be evacuated or there may be employed within the envelope 4 an inert gas at a predetermined pressure. The movable contact member 7 is pivotally mounted within the envelope 4 and includes a magnetic portion 8 and movable contacts 9 and 10. The movable contacts 9 and 10 are resiliently mounted and are supported by the magnetic portion 8. As actuating means for effecting vibratory or reciprocal motion of the movable contact member 7, I provide a pair of actuating coils 11 and 12 which are alternately energized and deenergized to effect the reciprocal or vibratory motion of the movable contact member. It is to be noted that the movable contact member 7 is arranged to attain three distinct positions, that is, one position in which the only contact established is that where the movable contact 9 engages the stationary contact 5, another position in which the only contact made is that where the movable contact 10 engages the stationary contact 6, and an intermediate position such as that shown in Fig. 1 where movable contacts 9 and 10 simultaneously engage stationary contacts 5 and 6 respectively. In order to effect the desired energization and deenergization of the actuating coils 11 and 12, these coils are connected to the stationary contacts 5 and 6 through resistances 13 and 14, which arrangement effects the desired control by alternately energizing and short circuiting the actuating coils 11 and 12. A permanent magnet 15 may be located in the vicinity of the magnetic portion 8 of the movable contact member 7 to serve as a means for providing an initial magnetic bias so that when the translating circuit is deenergized the movable contact member 7 is moved to engage only stationary contact 6. As a means for neutralizing the effect of the permanent magnet 15 after energization of the translating circuit from circuit 1 and during the operation of the circuit interrupting means 3, I employ a circuit including a resistance 16 and a coil 17 which establishes a magneto-motive force opposing or neutralizing that of the permanent magnet 15.

The circuit interrupting means 3 effects transfer of energy from the direct current circuit 1 to the alternating current circuit 2 through an inductive winding 18 and through two parallel circuits. The winding 18 is provided with two terminal connections 19 and 20, which are connected to the parallel circuits, and a connection 21 electrically intermediate the terminal connections 19 and 20. The intermediate connection 21 is connected to the positive terminal of the direct current circuit 1 through a smoothing reactance 22 and a switch 23. Connected in series relation with the terminal connections 19 and 20 and resistances 13 and 14, I provide impedance elements having nonlinear impedance-current characteristics which may be nonlinear inductive reactances such as self-saturating reactors or self-saturating inductive reactances 24 and 25, respectively. The nonlinear inductive reactances 24 and 25, by virtue of the self-saturating feature, control the current through circuit interrupting means 3 and comprise unitary means for accomplishing this result. These self-saturating reactors serve to reduce the current flowing through the circuit interrupting means 3 immediately prior to and during the circuit interrupting intervals, so that the duty imposed on the circuit interrupting means 3 is materially lessened. Inasmuch as the reactances 24 and 25 are saturable, it will be appreciated that the core members thereof will be constructed of a magnetic or ferromagnetic material. To control the saturable reactors 24 and 25 when the system is operating as an inverter to transmit current from the direct current circuit 1 to the alternating current circuit 2, to effect the above mentioned decrease in current through the circuit interrupting means during the switching operation, I employ a capacitance 26 which is connected across the terminals 19 and 20 of winding 18. Although the capacitance 26, or other suitable means, is required when the system is operating as an inverter and when the power factor of the load circuit 2 is lagging, it is to be understood that when the system is operating as a rectifier, the capacitance 26 may not be required. Of course, the capacitance 26 operates as a commutating means for commutating the current between the electric circuits.

Although I have chosen to represent my invention as applied to a system in which a particular type of circuit interrupting means is employed, it should be understood that my invention in its broadest aspects may be applied to systems in which other types of circuit interrupting devices are employed.

The operation of the embodiment of my invention diagrammatically shown in Fig. 1 will be considered when the electric translating system is operating to transmit energy from the direct current circuit 1 to the alternating current circuit 2. Prior to the closing of the switch 23, the movable contact member 7 of the circuit interrupting means 3 will be moved to the extreme right-hand position so that the movable contact 10 engages the stationary contact 6. This initial bias is effected by the permanent magnet 15 attracting the movable contact member 7. In this initial position, the movable contact 9 will not engage the stationary contact 5. When the movable contact member 7 is in this initial position, the actuating coil 12 will be short circuited through the resistance 14. Upon closing the switch 23, the neutralizing winding 17 will be energized from the direct current circuit 1 to establish a magnetomotive force which neutralizes the magnetomotive force of the permanent magnet 15 so that thereafter the operation of the movable contact member 7 is controlled by the actuating coils 11 and 12. Immediately after the switch 23 is closed, current will flow through the translating circuit in a circuit including smoothing reactor 22, the right-hand portion of winding 18, the self-saturating reactor 25, stationary contact 6 and movable contact 10 of the circuit interrupting means 3 and the negative terminal of the direct current circuit 1. During this same interval the left-hand plate of the capacitance 26 will be charged to a potential which is positive relative to the right-hand plate and at the same time the actuating coil 11 will be energized, tending to effect movement of the movable contact member 7 to the extreme left-hand position. When the current, and hence the magnetomotive force, of the actuating coil 11 attains a value sufficiently great to effect the movement of the movable contact member 7, this member will first move to the position shown in Fig. 1 where movable contacts 9 and 10 engage stationary contacts 5 and 6. In this position it is to be noted that there is provided a circuit through which the capacitance 26 may discharge. This discharge circuit includes the self-saturating reactor 24, stationary contact 5, movable contacts 9 and 10, stationary contact 6 and saturable reactor 25. When this circuit condition obtains the discharge of the capacitance 26 impresses across the terminals of the saturable reactor 25 a potential which tends to reduce the current which flows through this reactor. Saturable reactors 24 and 25 are designed to become saturated at the normal current transmitted through the two parallel paths including these reactors. The reduction in current through the saturable reactor 25 desaturates the reactor 25 and causes thereby a substantial increase in the inductance of this element. Because of this fact, the current through the saturable reactor 25 will be decreased to a relatively small value near the end of the conducting interval, so that contacts 10 and 6 will be required to interrupt only a relatively small portion of the current which has previously been transmitted through this circuit. Due to the inertia of the movable contact member 7, this member will be moved to the extreme left-hand position to cause movable contact 9 to engage the stationary contact 5. When in the intermediate position and in the left-hand position, movable contact 9 short-circuits actuating coil 11. Current will be transmitted to the translating system through a circuit including switch 23, the smoothing reactor 22, the left-hand portion of winding 18, the self-saturating reactor 24, stationary contact 5, movable contact 9, and the negative terminal of the direct current circuit 1. In a manner similar to that described above, the current near the end of the conducting interval for stationary contact 5 and movable contact 9 will be substantially decreased so that these contacts are required to interrupt only a portion of the current which flows during the greater part of the conducting interval.

The operation of the arrangement of Fig. 1 may be better understood by considering the operating characteristics represented in Fig. 5. Curve A of Fig. 5 represents the current transmitted to the electric translating system through the right-hand portion of winding 18 and curve B represents the current transmitted through the left-hand portion of the winding 18. The portion of the curve A lying within the interval $a$—$b$ represents the current which flows through the right-hand portion of winding 18 during the interval when the movable contact 10 engages stationary contact 6. At a time corresponding to the position of the line $b$, the movable contact member 7 attains the position shown in Fig. 1 where movable contacts 9 and 10 engage stationary contacts 5 and 6 respectively so that there is impressed across the terminals of the self-saturating reactor 25 a voltage tending to decrease the current flowing through this element. As a result thereof, it will be noted that the current transmitted through the saturable inductance 25, as represented by curve A, begins to decay and at a time corresponding to the position of line $c$ the current conducted through this element has been reduced to a relatively small portion of the current which previously flowed during this conducting interval. At a time corresponding to the position of line $d$, the current through the self-saturating reactor 25 has decreased to a still smaller value. The current through this portion of the electric translating system at time $e$ has been reduced to substantially zero. During the interval $e$—$f$, the movable contact 9 is in engagement with the stationary contact 5 and the movable contact 10 does not engage the stationary contact 6. At time $f$ the movable contact member 7 again obtains the position shown in Fig. 1, so that movable contacts 9 and 10 engage stationary contacts 5 and 6, respectively. The interval of time corresponding to the distance between lines $b$ and $d$ corresponds to the time when contacts 9 and 10 engage stationary contacts 5 and 6, respectively, or in other words this interval corresponds to the overlapping period. The contacts 10 and 6 are opened during the interval $d$—$e$ and the contacts 9 and 5 are opened during the interval $h$—$i$. During these latter mentioned intervals, it will be understood that the current to be interrupted is relatively small and that the duty imposed on the circuit interrupting means 3 will be quite small in comparison with the current conducted through the electric translating system during the intervals $a$—$b$ and $e$—$f$.

Since the current flow through the winding 18 reverses direction periodically, it will be understood by those skilled in the art that the voltage induced in this winding and hence the voltage impressed on the alternating current circuit 2 will be alternating, the circuit interrupting means 3 by virtue of its vibratory or reciprocal action effecting this selective energization of the portions of winding 18.

In Fig. 2 of the accompanying drawings I have diagrammatically shown another embodiment of my invention which is substantially the same as that shown in Fig. 1 and corresponding elements have been assigned like reference numerals. The winding 18 is associated with a core member 27 having saturable sections 28 and 29. A winding 30 is inductively associated with winding 18 and the saturable core sections 28 and 29 to control the saturation of these sections and hence to control the voltage impressed on the alternating current circuit 2. Winding 30 is energized through unidirectional conducting devices, such as the contact rectifiers 31, which supply unidirectional current to winding 30 through a smoothing inductive reactance 32. The unidirectional conducting devices 31 operate as a full wave rectifier and are energized in accordance with the voltage appearing across a portion of the winding 18. One terminal of the winding 30 is connected to the smoothing inductive reactance 32 and the other terminal is connected to the movable contact member 7 of the circuit interrupting means 3 through a conductor 33. In order to initiate the operation of the circuit interrupting means 3, I provide switches 34 and 35 which are mechanically interlocked so that the switch 34 is closed prior to the switch 35, in this way effecting energization of the actuating coil 11, prior to the energization of actuating coil 12, to move the movable contact member 7 to the left-hand position and to thereby initiate the vibratory motion of the movable contact member 7. After the closing of the switch 34 and the movement of the movable contact member 7 to the left-hand position, the capacitance 26 will be charged from the direct current circuit 1 to place the electric translating circuit in condition for operation. After the closure of both switches 34 and 35, the movable contact member 7 will be placed in vibratory motion by the selective energization of actuating coils 11 and 12. In Fig. 2 the self-saturable inductive reactances 24 and 25 are shown as being wound on a core member 36.

The operation of the embodiment of my invention shown in Fig. 2 is substantially the same as that explained in connection with the arrangement of Fig. 1. The saturable inductive reactances 24 and 25 are controlled by the discharge of the capacitance 26 to cause a decrease in the current through the circuit interrupting means 3 near the end of the conducting intervals, so that the movable contacts 9 and 10 may be disengaged from stationary contacts 5 and 6 without being required to interrupt a large current. By controlling the value of current supplied to the winding 30 by the unidirectional conducting devices 31 or by the proper design of the coil 30, I provide an arrangement for effecting substantial saturation of the sections 28 and 29 of core member 27 and in this way provide an arrangement for controlling the voltage of the alternating current circuit 2. As the saturation of sections 28 and 29 of the core member 27 is substantially increased, the amount of lagging quadrature current present in winding 18 will be substantially increased and the voltage of the alternating current circuit 2 will be decreased correspondingly. Conversely, if the saturation of the sections 28 and 29 is decreased, the voltage of the alternating current circuit 2 will be increased.

In Fig. 3 of the accompanying drawings there is shown another embodiment of my invention which is substantially the same in construction and arrangement as that shown in Fig. 2, and corresponding elements have been assigned like reference numerals. The self-saturable reactors 24 and 25 are provided with additional windings 37 and 38. Windings 37 and 38 are inductively associated with the core member 36 and serve as a means for controlling or adjusting the magnetic condition of the core member 36 during the circuit interrupting intervals and thereby control the rate of change of current through the saturable reactors 24 and 25 near the end of the conducting intervals. The windings 37 and 38 may be provided with taps and adjustable connections in order to provide an arrangement for controlling the magnetic condition of the saturable reactors during the starting and commutation intervals. The operation of the embodiment of my invention shown in Fig. 3 is substantially the same as that shown in Fig. 2.

Referring to Fig. 4 of the accompanying drawings, I have represented my invention as applied to an electric translating system for transmitting energy between a direct current circuit 39 and a three phase alternating current circuit 40. I provide a circuit interrupting means 41 which is driven in electrical synchronism with the voltage of the alternating current circuit 40 by means of a direct connected synchronous motor 42 through any suitable phase shifting arrangement, such as the rotary phase shifting device 43. The circuit interrupting means 41 is provided with a plurality of switching devices, such as switches 44 and 45 of the drum type, which may be direct connected to the synchronous motor 42. The switch 44 is provided with stationary brushes 46, 47, 48 and 49 and segments 50, 51, 52, and 53. Segment 50 is continuous and extends around the drum of switch 44, while segments 51, 52, and 53 are displaced about the periphery by a distance corresponding to 120 electrical degrees and being arranged to have a slight overlapping to permit facility in the commutation of current. In like manner, switch 45 is provided with stationary brushes 54, 55, 56, 57 and segments 58, 59, 60, and 61. Brushes 54—57, since they are shown as being located at the bottom of the associated drum, are displaced substantially 180 electrical degrees relative to brushes 46—49, inclusive, which are located at the top of the associated drum of switch 44. Segment 58 is a continuous segment and extends completely around the periphery of the drum, while segments 59, 60 and 61 are displaced substantially 120 electrical degrees.

In order to control the magnitude of the current which the circuit interrupting means 41 is required to interrupt during the commutation intervals, I provide a plurality of saturable inductive reactances or reactors 62, 63 and 64, each having a core member 65, a variable inductance winding 66 and a control winding 67. The winding 66 of each of the saturable reactances 62, 63 and 64 is connected in series relation with a predetermined phase conductor of the alternating current circuit 40, and the control winding 67, which in the particular arrangement shown is wound in the same direction as the winding 66, is energized in accordance with the current of a different phase conductor of the alternating current circuit 40.

A suitable filter circuit 68 is connected across conductors 69, 70 and 71 which interconnect the saturable reactors 62, 63 and 64 and the circuit interrupting means 41. The filter circuit 68 comprises three Y-connected circuits, each including a resistance 72 and a capacitance 73 which serve to suppress transients incident to the closing and opening of the contacts of the circuit interrupting means 41.

Figure 6:
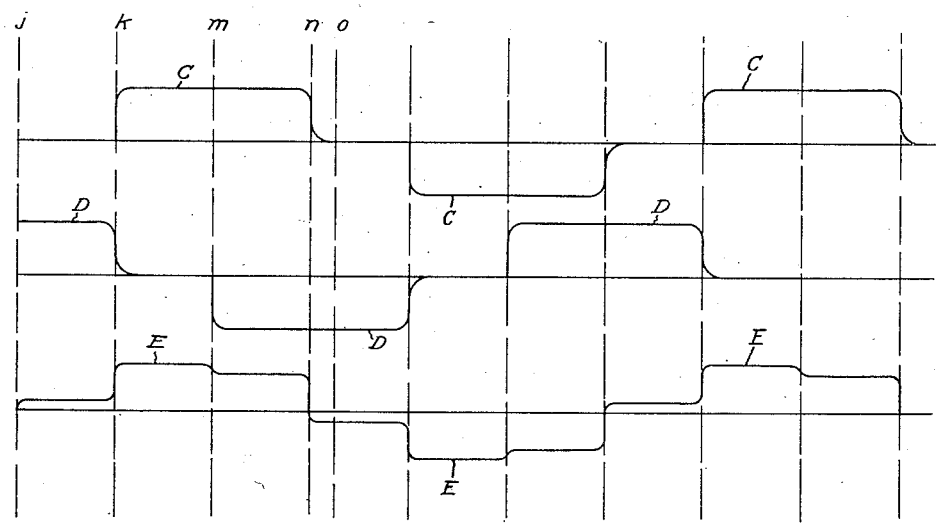

The operation of the embodiment of my invention shown in Fig. 4 may be best explained by considering the electric translating system when energy is being transmitted from the direct current circuit 39 to the alternating current circuit 40. Let it be assumed that the motor 42 is driving the drums of the switching devices 44 and 45 in electrical synchronism with the voltage of the alternating current circuit 40 and in a direction indicated by the arrow. At the time corresponding to the position of the switching devices 44 and 45 shown in Fig. 4, it will be noted that brush 47 is in contact with the segment 51 to conduct current to the alternating current circuit 40 through a circuit including control winding 67 of saturable reactor 63 and through winding 66 of saturable reactor 64. The curves of Fig. 6 represent certain operating characteristics of the arrangement of Fig. 4 and are here referred to in order to explain the operation of this arrangement. Curve C of Fig. 6 represents the current transmitted through winding 66 of reactor 64; curve D represents the current conducted through control winding 67 of saturable reactor 64, and curve E represents the magnetomotive force impressed on core member 65 of saturable reactor 64. No current is transmitted through the winding 66 of reactor 64 during the 60 electrical degrees corresponding to the interval $j$—$k$ but the control winding 67 of reactor 64 is energized through a circuit including the positive terminal of the direct current circuit 39, brush 46, conducting segments 50 and 52, brush 48, conductor 69, control winding 67 of reactor 64, winding 66 of reactor 62, one phase of the alternating current circuit 40, winding 66 of reactor 63, winding 67 of reactor 62, conductor 71, brush 54, conducting segments 61 and 58, brush 57, and the negative terminal of direct current circuit 39. It will be understood that during this interval the magnetomotive force impressed on core member 65 of reactor 64, as represented by curve E, is positive and may be of such a value to effect substantial saturation of the core member 65 so that at the time $k$ the inductive reactance of winding 66 is relatively small to permit a practically instantaneous rise of current through winding 66. During the interval lying between the lines $k$—$m$, corresponding to 60 electrical degrees, the winding 66 of saturable reactor 64 will be energized through a circuit including the positive terminal of the direct current circuit 39, brush 46, conducting segments 50 and 51, brush 47, conductor 70, control winding 67 of reactor 63, winding 66 of reactor 64, one phase of the alternating current circuit 40, winding 66 of reactor 63, control winding 67 of reactor 62, conductor 71, brush 54, conducting segments 61 and 58, brush 57, and the negative terminal of the direct current circuit 39. During the next 60 electrical degrees, corresponding to the interval between lines $m$—$n$, the winding 66 of reactor 64 will be energized through a circuit including brush 46, segments 50 and 51, brush 47, conductor 70, winding 67 of reactor 63, winding 66 of reactor 64, one phase of circuit 40, winding 66 of reactor 62, winding 67 of reactor 64, conductor 69, brush 56, segments 59 and 58 and brush 57. However, during the interval $m$—$n$ the control winding 67 of reactor 64 will be energized by a current which flows in an opposite direction to that which energized this winding during the interval $j$—$k$. Control winding 67 during the interval $m$—$o$ tends to establish in the core member 65 of reactor 64 a magnetomotive force opposing the magnetomotive force established by winding 66, and hence tends to desaturate core member 65. By reason of the increase of inductance of winding 66 of reactor 64 during the interval $m$—$o$ immediately prior to the interruption of the circuit by means of brush 47 and segment 51, and due to the commutating electromotive force of the associated phase of circuit 40, the current through winding 66 of reactor 64 will be substantially decreased so that the switching means 44 will be required to interrupt only a relatively small portion of the current which was transmitted during the interval $k$—$n$. Furthermore, as the current through winding 66 of reactor 64 decreases, the inductance of winding 66 will increase materially due to the nonlinearity of the reactor 64 to effect thereby a substantial decrease in the rate of change of current during the interval $n$—$o$. By so adjusting the angular position of the drums of the switching devices 44 and 45 relative to the voltage of the alternating current circuit 40 by the phase shifting means 43, I may control the switching devices 44 and 45 so that the circuits are interrupted at times when the current conducted through the various phase conductors is relatively small, involving little or no sparking. In like manner, the inductances of windings 66 of saturable reactors 62 and 63 will be increased near the end of the respective conducting periods to decrease the current, so that the switching operation is materially aided thereby imposing a relatively light circuit interrupting duty on the circuit interrupting means 41. It is to be further noted that I may arrange the control windings 67 of reactances 62, 63 and 64 on the cores so that these windings are oppositely wound relative to the windings 66 to effect the same result where an opposite phase rotation is employed.

Although the embodiments of my invention shown in Figs. 1 to 4, inclusive, have been explained under conditions when systems are operating as inverters to transmit energy from direct current circuits to alternating current circuits, it should be understood that my invention in its broader aspects may be applied to electric translating circuits generally where it is desired to transmit energy between alternating current circuits and direct current circuits, or between alternating current circuits of the same or different frequencies. A particular feature of the embodiment shown in Fig. 4 is the fact that when the system operates as explained above, the rise of current through the windings 66 of reactors 62, 63 and 64 is not delayed since the core members 65 are saturated prior to the time the circuits through windings 66 are established. This characteristic is of considerable advantage when the system is operated to transmit energy from an alternating current circuit to a direct current circuit, since the presence of an inordinate amount of inductive reactance in the windings 66 would lower the power factor of the current supplied to the system from the alternating current circuit 40. However, since the core member 65 is saturated prior to the time the various circuits are established by the switching means 44 and 45, the rise of current through the windings 66 of reactors 62, 63 and 64 is substantially instantaneous and the power factor of the alternating current circuit 40 is maintained at a relatively high value.

Another important feature of the arrangement of the saturable reactors 62, 63 and 64 is the improvement in economy effected by the particular arrangement of the windings 66 and 67. Referring to the operating characteristics shown in Fig. 6, it will be noted that during the interval $m$—$o$ the magnetomotive force due to the control winding 67 opposes that due to the winding 66 so that during the interval $m$—$o$ there is provided a greater useful range of flux variation than would be provided if the control winding 67 were not employed. Due to this increase in the useful flux range, or by reason of the greater available change in flux, I have found that a material improvement in economy of apparatus is obtainable in connection with the size and rating of the reactors 62, 63 and 64. By designing the reactors 62, 63 and 64 to become saturated at relatively small values of magnetomotive force, or in other words to become saturated for very small values of current flowing in windings 66 and 67, during the interval $m$—$n$, considering reactor 64 in particular, core member 65 will be saturated in one direction and during the interval $n$—$o$ there will be a tendency to saturate the core member 65 in the opposite direction by the current flowing through the winding 67. By operating the core member 65 within these extreme ranges of saturation, there is provided a substantial variation in flux by employing a relatively small saturable reactor.

In one sense, the saturable inductive reactances may be used as electric throttles inasmuch as they control the current, the magnitude of the current, and the rate of change of current immediately preceding and during the circuit interrupting operations. By so acting, the reactors relieve the duty imposed on the contacts of the switching apparatus.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus interposed between said circuits for transmitting energy therebetween including switching means, means for actuating said switching means, a reactor having a core member arranged to be saturated during the greater portion of energy transmitting intervals and being connected in series relation with said switching means, and means for controlling said reactor to increase the inductance of said reactor to effect a decrease in the current conducted by said switching means immediately preceding and during the switching operation.

2. In combination, an alternating current circuit, a direct current circuit, and electric translating apparatus interposed between said circuits including a circuit interrupting means having a pair of stationary contacts and a movable contact member, said movable contact member being arranged to engage said stationary contacts alternately, a winding having terminal connections and a connection electrically intermediate said terminal connections, said direct current circuit being connected between said electrically intermediate connection and said movable contact member and said alternating current circuit being connected to be energized in accordance with the voltage variations of said winding, a pair of reactors each comprising a core member arranged to be saturated during the greater portion of the conducting intervals established by said contacts and being connected in series relation between a different one of said terminal connections and a different one of said stationary contacts for controlling the current conducted by said circuit interrupting means during the circuit interrupting operation and means comprising a capacitance connected across said terminal connections for controlling the inductance of said reactors.

3. In combination, a direct current supply circuit, an alternating current load circuit, and an inverter interposed between said circuits for transmitting energy from said supply circuit to said load circuit including a winding having terminal connections and a connection electrically intermediate said terminal connections, an interrupting means comprising a pair of stationary contacts and a movable contact member, means for controlling said movable contact member to engage alternately said stationary contact members, said direct current supply circuit being connected between said electrically intermediate connections and said movable contact member, a pair of reactors each comprising a core member arranged to be saturated during the greater portion of energy transmitting intervals established by said contacts and being connected between a different one of said terminal connections and a different one of said stationary contacts and a capacitance connected across said terminal connections for controlling the inductance of said reactors to effect a decrease in the current conducted by said circuit interrupting means immediately prior to and during the circuit interruting operation.

4. In combination, a direct current circuit, an alternating current circuit, electric translating apparatus interposed between said circuits for transmitting energy therebetween comprising a pair of parallel circuits, circuit interrupting means for alternately connecting said parallel circuits in current conducting relation relative to said direct current circuit, each of said parallel circuits comprising a reactor comprising a core member arranged to be saturated during the greater portion of conducting intervals and being connected in series relation with said circuit interrupting means and means comprising a capacitance connected across said parallel circuits for controlling the inductance of said reactors to effect a decrease in the current conducted by said parallel circuits immediately preceding the circuit interrupting operations.

5. In combination, a direct current circuit, an alternating current circuit, and electric translating apparatus interposed between said circuits comprising an inductive winding having terminal connections and a connection electrically intermediate said terminal connections, two parallel circuits each connected between a different one of said terminal connections and one terminal of said direct current circuit, the other terminal of said direct current circuit being connected to said intermediate connection, a circuit interrupting means comprising a pair of stationary contacts each connected to one of said parallel circuits and a movable contact member having one extreme position to engage one of said stationary contacts and another extreme position to engage the other of said stationary contacts and having an intermediate position to engage both of said stationary contacts simultaneously and means for operating said movable contact member, a pair of reactors each comprising a core member arranged to be saturated during the greater portion of current conducting intervals established by said contacts and being connected in a different one of said parallel circuits and a capacitance connected across said terminal connections for controlling the inductance of said reactors by discharging through said circuit interrupting means when said movable contact member is in said intermediate position.

6. In combination, an alternating current circuit, a direct current circuit, and electric translating apparatus interposed between said circuits including a circuit interrupting means having a pair of stationary contacts and a movable contact member, said movable contact member being arranged to engage said stationary contacts alternately, a winding having terminal connections and a connection electrically intermediate said terminal connections, said direct current circuit being connected between said electrically intermediate connection and said movable contact member and said alternating current circuit being connected to be energized in accordance with the voltage variations of said winding, a pair of reactors each comprising a core member arranged to be saturated during the greater portion of current conducting intervals established by said contacts and being connected in series relation between one of said terminal connections and one of said stationary contacts for controlling the current conducted by said circuit interrupting means during the circuit interrupting operation, means comprising a capacitance connected across said terminal connections for controlling the inductance of said reactors immediately preceding and during the circuit interrupting operation and means associated with said winding for controlling the inductance thereof to effect control of the voltage of said alternating current circuit.

7. In a circuit interrupting means the combination of a pair of stationary contact members, a movable contact member, actuating means for controlling said movable contact member to cause said member to engage alternately said stationary contact members, a permanent magnet for biasing said movable contact member into engagement with one of said stationary contact members prior to the energization of said actuating means and means for neutralizing the effect of said permanent magnet after the energization of said actuating means.

8. In a circuit interrupting device the combination of an enclosing envelope, an atmosphere of an inert gas at a partial vacuum within said envelope, a pair of stationary contacts and a movable contact member enclosed within said envelope, said movable contact member having a magnetic portion and being pivotally mounted within said envelope, a pair of coils for moving said movable contact member to cause said member to engage alternately said stationary contact members, a permanent magnet for biasing said movable contact member in engagement with one of said stationary contact members and a coil for neutralizing the effect of said permanent magnet after the energization of said coils.

9. In combination, an alternating current circuit, a direct current circuit, electric translating apparatus interposed between said circuits comprising a circuit interrupting means and a reactor having a core member arranged to be saturated during the greater portion of current transmitting intervals established by said translating apparatus and having a winding connected in series relation with said circuit interrupting means and a winding inductively associated with said first mentioned winding to control the inductance of said first mentioned winding to decrease the current and the rate of change of current to provide an interval of time sufficient to permit operation of said circuit interrupting means.

10. In combination, an alternating current circuit, a direct current circuit, electric translating apparatus interposed between said circuits comprising a circuit interrupting means and a saturable reactor having a winding connected in series relation with said circuit interrupting means and a winding inductively associated with said first mentioned winding, and means for energizing said control winding to saturate said reactor prior to the energization of said series winding and for controlling the energization of said control winding to decrease the current and the rate of change of current conducted by said circuit interrupting means immediately prior to and during the circuit interrupting operation to provide an interval of time within which the circuit interrupting means may be opened.

11. In combination, an alternating current circuit, a direct current circuit, electric translating apparatus interposed between said circuits comprising a plurality of circuit interrupting means arranged to conduct current during predetermined intervals, commutation means including a plurality of saturable reactors each associated with a different one of said circuit interrupting means and each having a winding connected in series relation with the associated circuit interrupting means and having a control winding inductively associated with said first mentioned winding, and means for energizing said control windings to saturate said reactor immediately prior to the energization of said associated series winding and being arranged to cooperate with the commutating voltage of the alternating current circuit to effect a substantial reduction in the current through the associated circuit interrupting means immediately prior to and during the circuit interrupting operation.

12. In combination, an electric translating system including a plurality of circuit interrupting devices connected therein and arranged to conduct current during predetermined intervals and in a predetermined order, and means for reducing the current through each circuit interrupting device immediately preceding the circuit interrupting operation comprising a plurality of saturable reactors each having a winding connected in series relation with the associated circuit interrupting device and each having a control winding inductively associated with said first mentioned winding and energized in accordance with the current conducted by another of said interrupting devices.

13. In combination, an electric translating system comprising a plurality of electric circuits, a plurality of circuit interrupting devices connected in said circuits and arranged to periodically open and close said circuits, and means for controlling the rate of change of the current through said circuit interrupting devices immediately preceding the circuit interrupting operations comprising a plurality of saturable reactors each associated with a different one of said electric circuits and each comprising a winding connected in series relation with a predetermined different one of said circuit interrupting devices and each including another winding energized in accordance with the current of another of said electric circuits to control the inductance of said first mentioned windings.

14. In combination, a polyphase alternating current circuit, a direct current circuit, an electric translating circuit interposed between said circuits and including a plurality of circuit interrupting devices operating in electrical synchronism with said alternating current circuit and arranged to conduct current during predetermined intervals and in a predetermined order, and a plurality of saturable reactors each associated with a different one of said circuit interrupting devices and each comprising a winding connected in series relation with the associated circuit interrupting device and each comprising a second winding energized in accordance with the current of another phase of said alternating current circuit to increase the inductance of the first mentioned winding when current is commutated from the associated circuit interrupting device.

15. In combination, a supply circuit, a load circuit, translating apparatus interposed therebetween including a circuit interrupting means arranged to conduct current during predetermined intervals, means comprising a nonlinear inductive reactance having a saturable magnetic core member for decreasing the current and the rate of change of current to provide an interval of time sufficient to permit operation of said circuit interrupting means, and means comprising a capacitance connected in circuit with said nonlinear inductive reactance for controlling the impedance thereof to decrease the current and the rate of change of current during the circuit interrupting operations.

16. A contact device for alternating currents, comprising at least one mechanical interrupter, a synchronous motor designed to be operated with the frequency of the current to be interrupted, an operative connection between said motor and the movable contact of said interrupter, said connection being adjusted so as to effect the interruption in the neighborhood of the zero value of the current, and means for periodically reducing the current intensities in the neighborhood of said zero value comprising saturable inductive means connected in circuit with said interrupter and means including at least one impedance arranged in parallel connection to the break of said interrupter.

17. A multiple phase contact device for alternating currents, comprising a mechanical interrupter for each phase of said current, a motor designed to be operated in synchronism to the current to be interrupted and operatively connected with said interrupters so as to open each interrupter in the neighborhood of the zero value of the current, induction windings series connected to each interrupter for reducing the current intensities in the neighborhood of said zero value, said windings being arranged on a ferromagnetic body designed to be unsaturated at small current values in the neighborhood of the zero value and to be saturated at higher values of the current cycle, and means comprising an impedance in parallel connection to the break of each interrupter.

18. A contact device for alternating currents, comprising a mechanical interrupter for each phase of said current, said interrupter having its contacts arranged in a vessel disposed for maintaining around said contacts a medium of higher disruptive strength than air of atmospheric pressure, a synchronous motor designed to be operated with the frequency of the current to be interrupted, an operative connection between said motor and said interrupter adjusted to open the contacts of said interrupter in the neighborhood of the zero value of the current, means for periodically reducing the current intensities in the neighborhood of said zero value, and means comprising an impedance in parallel connection to the break of said interrupter.

19. A multiple phase contact device for alternating current, comprising a circuit breaker for each phase of said current, a common drive for said circuit breakers designed to actuate said breakers in synchronism with the current to be interrupted and to open each breaker at a time near the zero value of said current, a reactor allotted to each breaker, said reactor having a ferromagnetic body provided with two windings, one of said windings being series-connected to said breaker, the other winding being connected to a current source for exciting said ferromagnetic body so that said body is unsaturated at small values and saturated at higher values of the current to be interrupted, and at least one impedance connected in parallel to each breaker.

20. A contact device for alternating current, comprising a mechanical interrupter for each phase of said current, common driving means for said interrupters disposed to actuate said interrupters in synchronism with the current to be interrupted and to open the contacts of each interrupter at a time near the zero value of the current in the phase of said interrupter, a reactor allotted to each of said interrupters, said reactor having a ferromagnetic body and two windings on said body, one of said windings being series-connected to the contacts of said interrupter to offer a variable impedance to the flow of current, said other winding being energized by the current conducted by another phase.

21. A multiple phase contact device for alternating current, comprising a circuit breaker for each phase of said current, means for opening each of said breakers near the moment when the current in the phase of said breaker passes its zero value, a reactor for each of said breakers having two windings and a magnetic core, one of said windings being series-connected with said breaker, the other winding being connected to an alternating current source having the same frequency as the current to be interrupted, and at least one impedance connected to the contacts of each breaker so as to be arranged in parallel to the break.

22. A mechanical interrupting apparatus for periodically interrupting alternating current in converters, inverters or rectifiers, comprising a contact circuit breaker in each phase of the alternating current to be interrupted, a common synchronous motor for periodically opening the contacts of said circuit breakers during a time interval in the neighborhood of the zero value of the current, means for periodically distorting and flattening the current curve of the alternating current to be interrupted, said means comprising an impedance in each phase parallel connected to the break of said breaker, and an inductor in each phase series-connected to said break.

23. A commutating device for rectifying or converting alternating current, comprising a mechanical interrupter for each phase of said current, a drive for actuating said interrupter in synchronism with said current, means for adjusting the phase position of each interrupter in order to effect the opening of said interrupter at a time near the zero value of the current to be interrupted, a variable alternating current resistance allotted to each alternating current phase and series-connected to said interrupter, said resistances being designed to periodically increase their apparent resistance so as to reduce the current intensities in the neighborhood of said zero value, current responsive means designed to bias the apparent resistance of said resistances in accordance with variations of the current of said device, and at least one impedance connected in parallel to the break of each interrupter.

24. A commutating device for rectifying or converting alternating current, comprising a mechanical interrupter for each phase of said current, a drive for actuating said interrupter in synchronism with said current, means for adjusting the phase position of each interrupter in order to effect the opening of said interrupter at a time near the zero value of the current to be interrupted, a variable inductance allotted to each alternating current phase and series-connected to the interrupter of said phase, means for biasing said inductance periodically so as to increase the apparent resistance of said inductance during the commutation period of said interrupter, and current responsive means designed to additionally bias said inductance in accordance with variations of the current of said interrupter.

25. In combination, a direct current supply circuit, an alternating current load circuit, electric translating apparatus interposed between said circuits for transmitting energy therebetween including switching means, means for actuating said switching means, a saturable inductive reactance connected in series relation with said switching means for decreasing the current conducted by said switching means immediately preceding and during the circuit interrupting operation, and a capacitance for connecting in circuit with said inductive reactance and for increasing the impedance thereof to the flow of current preceding and during said interrupting operation.

26. In combination, a direct current supply circuit, an alternating current load circuit, electric translating apparatus interposed between said circuits for transmitting energy therebetween including switching means, means for actuating said switching means periodically, a saturable inductive means comprising a winding connected in series relation with said switching means to decrease the current and the rate of change of current conducted by said switching means immediately preceding and during the switching operation, and a capacitance for connecting in circuit with said inductive means and for increasing the impedance of said winding periodically.

27. In combination, a direct current supply circuit, an alternating current load circuit, electric translating apparatus connected between said circuits for transmitting energy therebetween including a winding and switching means for controlling the direction of current flow through said winding, a saturable reactor having a core member arranged to be saturated during the greater portion of the energy transmitting intervals and being connected in series relation with said switching means, and a capacitance for controlling said reactor to increase the inductance of said reactor and to effect thereby a decrease in the current conducted by said switching means during the switching operation.

28. In combination, a direct current supply circuit, an alternating current load circuit, electric translating apparatus connected between said circuits for transmitting energy therebetween and including switching means, means for actuating said switching means, a transformer including a core member and having a winding connected to said load circuit, a saturable inductive reactance connected in series relation with said switching means for decreasing the current conducted by said switching means immediately preceding and during the circuit interrupting operation, and a capacitance for connecting in circuit with said inductive reactance and for increasing the impedance thereof to the flow of current preceding and during said interrupting operation.

29. In combination, a direct current supply circuit, an alternating current load circuit, electric translating apparatus connected between said circuits for transmitting energy therebetween and including switching means, means for actuating said switching means, a transformer including a core member and having a winding connected to said load circuit, a saturable inductive reactance connected in series relation with said switching means for decreasing the current conducted by said switching means immediately preceding and during the circuit interrupting operation, means for controlling the magnetic condition of said core member to control the voltage of said load circuit, and a capacitance for producing commutating voltage to assist the operation of said saturable reactance.

30. In combination, a direct current circuit, an alternating current circuit, electric translating apparatus connected between said circuits for transmitting energy therebetween and including switching means, means for actuating said switching means, a transformer including a winding connected to said alternating current circuit and having portions thereof connected in series relation with said switching means, and means for circulating unidirectional current through at least a portion of said winding for controlling an electrical condition of said alternating current circuit.

BURNICE D. BEDFORD.